US005944303A

United States Patent [19]

Reed

[11] Patent Number: 5,944,303

[45] Date of Patent: Aug. 31, 1999

[54] HOLDER AND TURNTABLE FOR AN ENGINE HEAD

[75] Inventor: Gary Jack Reed, Turlock, Calif.

[73] Assignee: Louis A. Rollins, Turlock, Calif.

[21] Appl. No.: 08/759,454

[22] Filed: Dec. 5, 1996

[51] Int. Cl.[6] .................... B23Q 1/03

[52] U.S. Cl. .................... 269/71; 269/289 R; 269/290; 269/293; 269/309

[58] Field of Search .................... 269/71, 289 R, 269/21, 48, 49, 57, 73, 81, 83, 87, 315

[56] References Cited

U.S. PATENT DOCUMENTS

| | | | |
|---|---|---|---|
| 106,080 | 8/1870 | Saurman | 269/254 CS |
| 2,835,964 | 5/1958 | Yarwood | 269/71 |
| 3,700,228 | 10/1972 | Peale | 269/71 |
| 4,027,767 | 6/1977 | Gluck | 269/57 |
| 4,564,179 | 1/1986 | Hollingsworth | 269/71 |
| 4,662,806 | 5/1987 | Reed . | |
| 4,726,577 | 2/1988 | Pontis | 269/71 |
| 4,760,997 | 8/1988 | Fager | 269/71 |
| 4,845,828 | 7/1989 | Reed . | |
| 5,065,495 | 11/1991 | Narushima et al. | 269/21 |
| 5,180,000 | 1/1993 | Wagner et al. | 269/21 |
| 5,255,901 | 10/1993 | Rottler | 269/309 |
| 5,379,505 | 1/1995 | Reed . | |
| 5,417,532 | 5/1995 | Reed . | |
| 5,499,892 | 3/1996 | Reed . | |
| 5,562,371 | 10/1996 | Reed . | |
| 5,676,360 | 10/1997 | Boucher et al. | 269/57 |

*Primary Examiner*—David A. Scherbel
*Assistant Examiner*—Lee Wilson
*Attorney, Agent, or Firm*—Bernhard Kreten

[57] ABSTRACT

A work holder for internal combustion engine heads in which an upper platen is adapted to be fixedly retained vis-a-vis an underlying platen so that an operator can contact the head operatively coupled to the upper platen for work thereon for crack repair.

16 Claims, 3 Drawing Sheets

HOLDER AND TURNTABLE FOR AN ENGINE HEAD

FIELD OF THE INVENTION

The following invention relates generally to instrumentalities which secure and orient objects to be worked on. More specifically, the instant invention is directed to a work holder for engine heads which allows the engine head to be securely addressed and oriented for subsequent working such as crack repairing.

BACKGROUND OF THE INVENTION

This invention lends itself to utilization with the following patents.

| U.S. Pat. No. | ISSUE DATE | INVENTOR |
|---|---|---|
| 4,662,806 | May 5, 1987 | Reed |
| 4,845,828 | July 11, 1989 | Reed |
| 5,379,505 | January 10, 1995 | Reed |
| 5,417,532 | May 23, 1995 | Reed |
| 5,499,892 | March 19, 1996 | Reed |
| 5,562,371 | October 8, 1996 | Reed |

In procedures that involve repairing cracks in a cylinder head, a drill must be properly oriented with respect to a crack in the head so that each hole in a series of holes can be drilled in the crack at a precise angle as set forth in these patents. Since heads for internal combustion engines have a complex contour, and particularly because crack migration tends to travel along areas of casting crystallization and stress lines which are not linear, precision drilling along a plane normal to a crack entails a series of micro adjustments vis-a-vis the head involving continual reorientation of the drill with respect to the head.

Heretofore, the head was placed such that the crack would be exposed to a craftsman who typically moves around the head. Such a technique is cumbersome since crack repair involves treatment with several drilling or abrading tools coupled with manipulation of the crack via a series of jigs and guides. Accordingly, as the craftsman moved around the head, tools which should be strategically adjacent the craftsman needed to be retrieved.

SUMMARY OF THE INVENTION

The instant invention is distinguished from the prior art in a multiplicity of ways. For one thing, the instant invention allows the head to be moved rather than the craftsman. In this way, the head can be oriented for precision treatment by the craftsman.

As a corollary to this benefit, the tools of the craftsman remain in an optimum position with respect to the head so that they are readily accessible by the craftsman at all times with minimum down time.

In essence, a first lower platen underlies a second upper platen. The upper platen is capable of selective rotation with respect to the lower platen to allow micro adjustments of the upper platen around a vertical axis defined by a central point of the upper platen. Further, the upper platen supports the engine head by means of a pair of pivot arms. Each pivot arm is pivotally connected to a top surface of the upper platen and is located on a chord remote from a diameter of the upper platen. These first and second pivot arms radiate towards a diameter associated with the platen. Each arm includes an upwardly tapering stud pin fixed on the pivot arm which receives the head by locating the stud pins within head bores through which threaded studs are traditionally used to locate and fix the head on a cylinder block.

The first and second pivot arms underlie a transverse member disposed on a top surface of the upper platen. This transverse member has a pair of holes therethrough intermediate its length, such that the extremities of the transverse member overlie the pivot arms. These holes receive a pair of headed bolts, with the bolts having threads complemental to an interior bore on the upper platen so that upon advancement of the headed bolts, they can bear pressure against the upper platen and provide a downward force on the first and second pivot arms which are sandwiched between the transverse member and the platen and thus held in fixed relationship. In this way, an engine head placed on the stud pins is held in fixed position for subsequent manipulation.

The lower platen is fixed while the upper platen is capable of rotation about a central axis upon appropriate manipulation thereof. In one form of the invention, air is admitted through the lower platen and contacts the space between the upper and lower platens. This allows the upper platen to "float" upon an air cushion for easy rotation. The upper platen is normally forced down towards the lower platen by means of a compression spring along the axis of rotation. The air pressure is sufficient to overcome this compression force. The lower platen is provided with a V-shaped circular groove which enhances the air pressure along a circular area inboard of the V-shaped groove. The groove allows the upper platen to be translated vertically in the direction away from the lower platen so that with the air between the two platens, the upper platen is freely moveable. With the release of the pressure, the upper platen is frictionally constrained by the lower platen and by spring pressure.

OBJECTS OF THE INVENTION

Accordingly, it is a primary object of the present invention to provide a new and novel work holder particularly for use with engine heads for crack repair.

A further object of the present invention is to provide a device as characterized above which is extremely durable in construction and reliable in use and affords precision placement of the head with respect to an craftsman.

A further object of the present invention is to provide a device as characterized above which affords the craftsman precise access to the head at all times without requiring the craftsman to move so that the craftsman has unobstructed access with both the head and tools which flank him on both sides.

A further object of the present invention is to provide a device as characterized above in which the tools which flank the craftsman on either side allows either a left-handed or right-handed person the ability to use these tools or reorient them from one side to the other as necessary.

A further object of the present invention is to provide a device as characterized above which lends itself to mass production techniques.

A further object of the present invention is to provide a device as characterized above which allows micro adjustments of the head with respect to the craftsman.

A further object of the present invention is to provide a device as characterized above which securely adheres the head via its platen to a position for subsequent manipulation by the craftsman.

Viewed from a first vantage point, it is an object of the present invention to provide an engine head support, comprising, in combination: a platen, means to removeably couple the platen to an engine head, and means to selectively rotate and then hold the platen into position to allow orientation and then work on the head.

Viewed from a second vantage point, it is an object of the present invention to provide an engine head holder comprising, in combination: upper and lower platens, means to allow selective rotation between the upper platen and the lower platen, and means to support the head on the upper platen.

Viewed from a third vantage point, it is an object of the present invention to provide a method for working on an engine head, the steps including: impaling the head on projections, locating the projections on arms, pivoting the arms on a platen, fixing the arms with respect to the head and the platen, and selectively moving the platen to gain access to various facets of the head.

These and other objects will be made manifest when considering the following detailed specification when taken in conjunction with the appended drawing figures.

DESCRIPTION OF PREFERRED EMBODIMENTS

Figure 1:
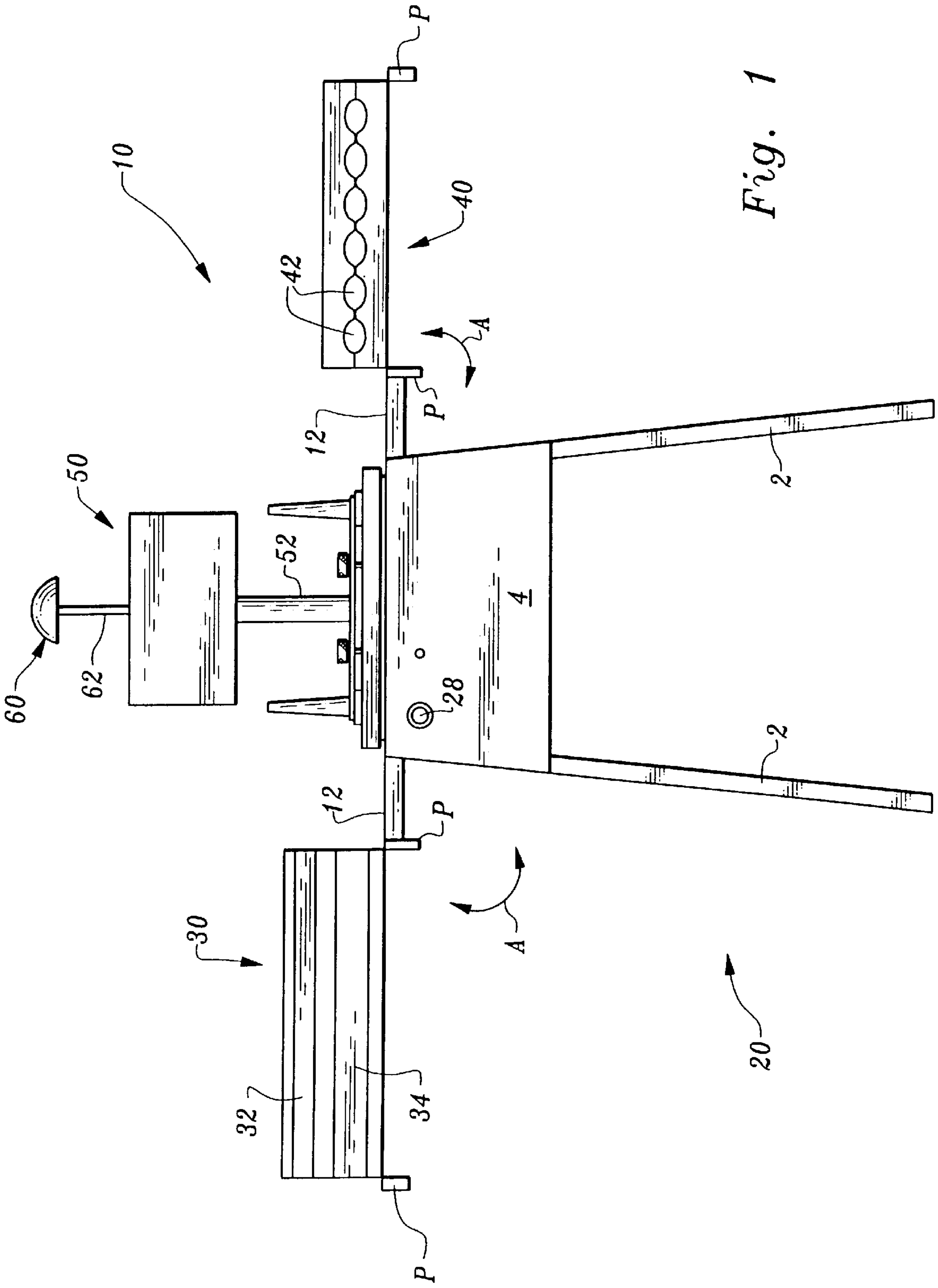
FIG. 1 is front view of the apparatus according to the present invention.

Considering the drawings, wherein like reference numerals denote like parts throughout the various drawing figures, reference numeral 10 is directed to a device which provides an engine head holder and turntable according to the present invention.

As shown in FIG. 1, the device 10 includes a support base 20, a shelf mechanism 30 carried on one side of the base 20, a tool holder 40 carried on an opposite side of the base 20, a parts bin 50 carried on a rear portion of the base 20 and a light 60 extending from the parts bin 50 and overlying a central work area. Both the shelf 30 and holder 40 pivot about pivots P to move from a compacted storage position to a fanned out deployed position as shown in FIG. 1. The pivots P are located in pairs for the shelf 30 and the holder 40 and therefore allow the shelf 30 and tool holder 40 to be transposed to opposite sides to accommodate people with a different dominant hand.

Specifically, the base 20 includes a plurality of legs 2. Preferably four legs are provided for stability. The legs 2 have a wide stance at a lowermost extremity and converge upwardly towards a housing 4 having four enclosed sides which similarly converge upwardly to a top surface 6 defining a truncated, hollow four sided pyramid. The tool shelf 30 includes an upper tier 32 and a lower tier 34 for placement of articles thereon. Typically, hand tools, working fluids such as lubricants and aerosols can be placed conveniently for access by a user. The tool holder 40 includes a plurality of openings 42 which serve as holsters within which power tools are stored for ready access. Both the shelf 30 and tool holder 40 are laterally offset from the base 20 by means of wings 12 formed on the housing 4 that provide clearance away from the housing 4. The tool shelf 30 and the tool holder 40 allow motion about the double-ended arrow “A”. The pivot P extends in a vertical plane and allows the tool holder 40 and storage shelf 30 to move. The parts bin 50 is supported on mast 52 and the light 60 includes a stem 62 that allows the light 60 to illuminate an area above a platen 18 to be discussed.

Figure 2:
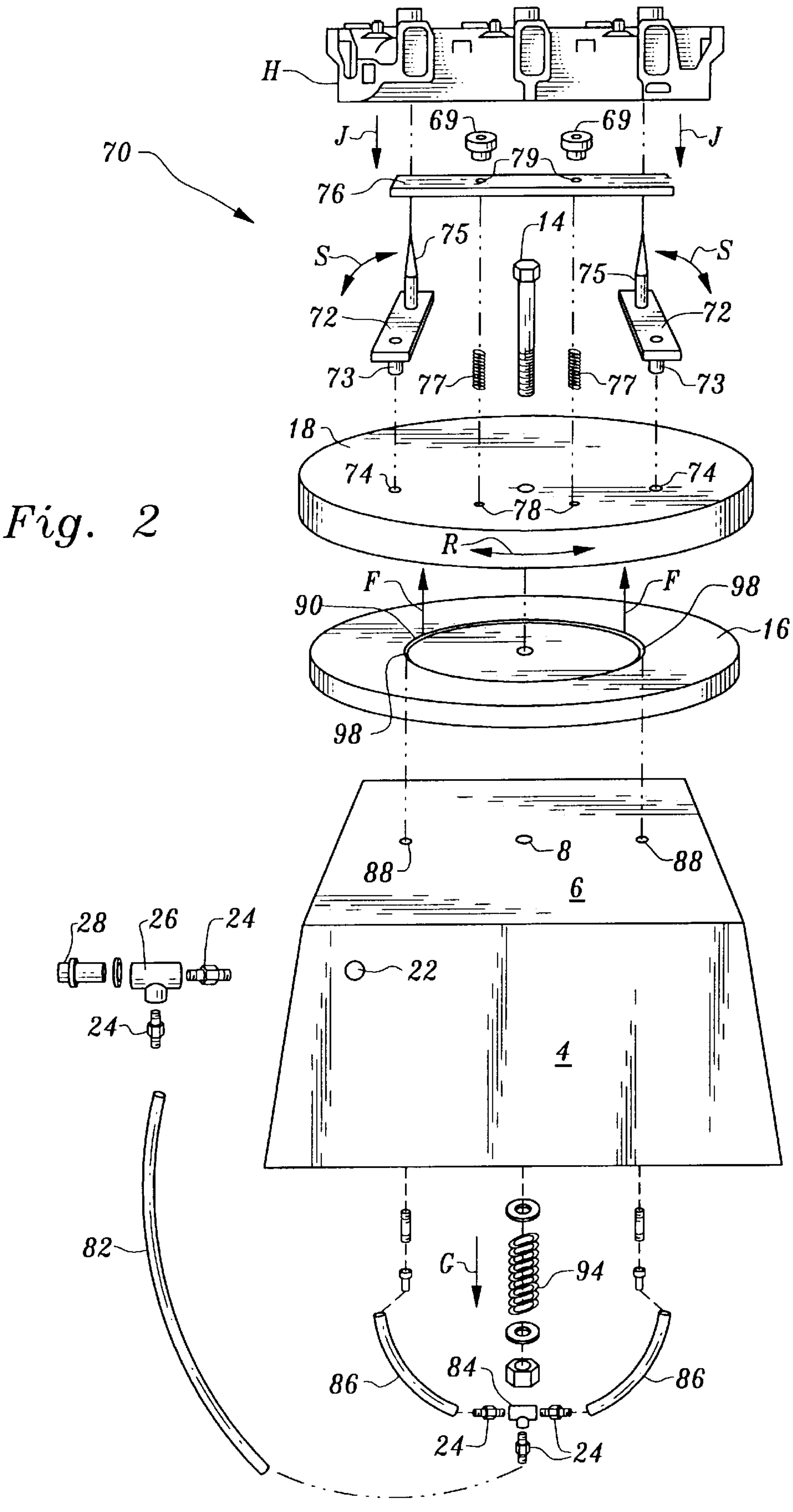
FIG. 2 is an exploded parts view of a portion of FIG. 1 showing the operating mechanism of certain elements.

With reference to FIG. 2, details of the area above the housing 4 can be explored. In essence, the housing 4 includes a top wall 6 having a center hole 8 dimensioned for a bolt 14 to pass therethrough. The bolt 14 locates a lower platen 16 below an upper platen 18 such that, as will be described, the upper platen 18 can move with respect to the lower platen 16 about the direction of the arrow “R”. One wall of the housing 4 includes an opening 22 which allows air to pass through fittings 24 and beyond a valve 26 operated by valve operator 28, configured as a push button. This allows air to pass via a tube 82 into a tee 84 allowing air to pass into two branch passageways 86 and through the top wall 6 of the housing 4 via holes 88. Air passes through holes 98 contained on the lower platen 16.These two holes 98 are formed within a circular groove 90 disposed inboard from an outer periphery of the platen and concentrically disposed with respect to the bolt 14 passing therethrough. The groove 90 is substantially V-shaped in cross-section and is recessed downwardly from the upper platen 18. When air passes through openings 98, a “curtain” of air extends from the groove which “bleeds” to an outer edge of platen 16, and a force F is created which tends to raise the upper platen 18 to ease the amount of effort that is required to move the upper platen about the direction of the arrow “R”. This allows the platen to be moved substantially effortlessly. In the absence of the air and the resulting force F, the platen is much more difficult to move. The degree of difficulty is enhanced by means of a compression spring 94 which fixes to the bolt 14 on a bottom side of the top wall 6 of the housing 4. This provides a force through the bolt on the upper platen 18 in the direction of the arrow “G” so that in the absence of air pressure, the upper platen is secure to allow precise work to be done on the head H.

As shown in FIG. 2, a head H from an internal combustion engine can be supported via a head support 70 located on the upper platen 18. A pair of first and second pivot arms 72 have a pivot 73 extending into holes 74 on the top surface of the platen 18 to permit rotation of the pivot arm 72 about the pivot 73 in the direction of the arrow “S”. Pivot arms 72 are located on a chord of the substantially circular upper platen 18 and each pivot 73 is equidistant from a center of the upper platen 18 through which the bolt 14 passes. First and second stud pins 75 project upwardly from the pivot arms on an end thereof remote from pivot 73 and these stud pins 75 have a conical taper as they extend away from the first and second pivot arms 72. These stud pins 75 are sized to be located within stud holes found on all internal combustion engine heads since these stud holes are used to locate and fix the head on the block of an engine. Once the head has been impaled by the stud pins 75, a transverse member 76 which defines a pivot arm fixing means can be clamped down on the pivot arms 72. Specifically, threaded bolts 77 pass into threaded bores 78 passing into the upper platen 18. The transverse arm 76 has complemental holes 79 to receive the bolts 77 therethrough. Knobs 69 on a top side of the transverse arm contact the bolt 77 to provide a force in the direction of the arrow “J” on the pivot arm 72 through the transverse member 76. Once the transverse member 76 is locked tight, the head is secured to the upper platen 18.

Figure 3:
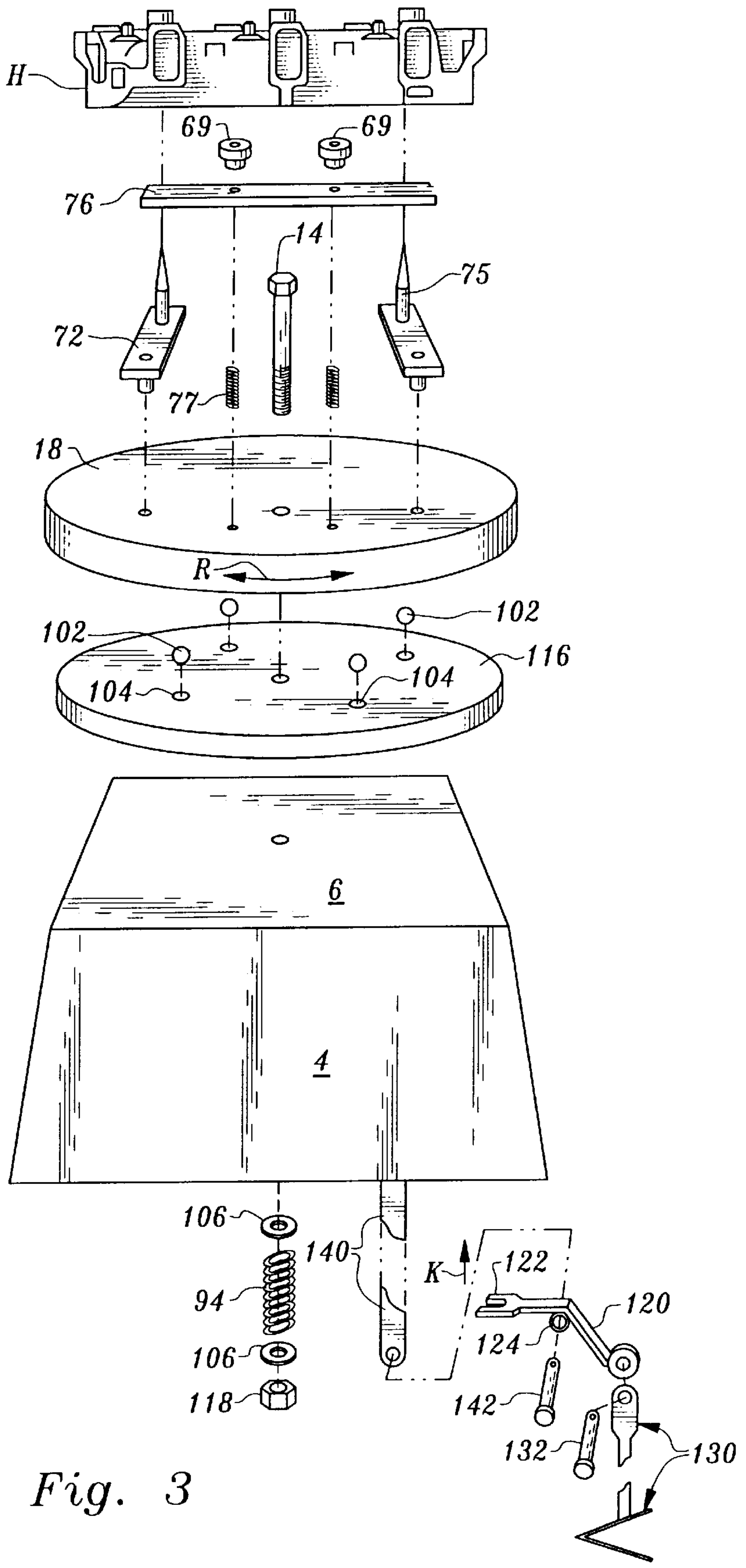
FIG. 3 is a view similar to FIG. 2 showing a second embodiment.

FIG. 3 reflects a similar device bearing similar reference numerals. Those common numerals shall not be belabored further. Only the differences between the two versions shall be explored. Succinctly, air does not assist in the rotation of the upper platen 18 with respect to a lower platen 116. Instead, four ball bearings 102 are constrained to reside within four hemispherical cups 104 on a top surface of the lower platen 116. This allows the upper platen 18 a low friction bearing surface for rotation about the direction of the double-ended arrow "R". Free rotation is controlled by means of mechanical leverage altering the efficiency of the spring 94. In this case, force in the direction of the arrow "K" through a lever 120 decreases the force exerted by further compressing the spring 94. The lever 120 has a bifurcated first end 122 which straddles an end of the bolt 114 between the spring 94 and a complemental nut 118. The spring is separated from the bifurcated end 122 by washer 106. The lever 120 has a second end that provides access to a foot control and link 130 via pivot 132. The lever 120 has a bend at a central area thereof and includes a fulcrum 124 at the bend in the lever. The lever 120 pivots about fulcrum 124 via pivot 142. Pivot 142 is fixed to a strut 140 that attaches to the housing 4 to hold the lever 120 in a fixed position. Operating the pedal/linkage 130 affects the force of the spring 94 to release or lock the platen 18.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. An engine head work station, comprising, in combination:

a support base, a shelf mechanism carried on one side of said base, a tool holder carried on an opposite side of said base, a platen located atop said base, projection means to removeably impale said platen to an engine head, means to selectively rotate and then hold said platen into position to allow orientation and then work on the head, a parts bin carried on a rear portion of said support base between said shelf mechanism and said tool holder, and a source of illumination attached to said work station projecting light on said platen.

2. The work station of claim 1 including pivot means between said shelf mechanism and said base and between said tool holder and said base to allow rotation about said pivots.

3. The work station of claim 1 including a lower platen interposed between said platen and said support base, a bolt passing through said platen, said lower platen and a top surface of said base, said bolt supporting a spring on said bolt below said top surface of said support base, said spring providing a force through the bolt on said platen to hold said platen against said lower platen to allow precise work to be done on the engine head.

4. The work station of claim 1 wherein said projection means comprise first and second stud pins projecting from said platen and supported thereby, said stud pins having means to adjust the relative spacing between said stud pins allowing said stud pins to align with bores passing through the engine head to securely locate the engine head on said platen by said stud pins projecting into the bore holes.

5. The work station of claim 4 including clamping means to constrain said stud pins from motion once said stud pins are holding the engine head.

6. The work station of claim 3 including a source of pneumatic air communicating with said lower platen, a groove circumscribing said lower platen and facing said platen, said groove having openings receiving said source of air whereupon activation of said air overcomes the spring force and raises the platen from said lower platen allowing rotation of said platen.

7. The work station of claim 3 including a lever having a bifurcated first end which straddles an area of said bolt adjacent said spring and held thereto by a complemental nut, said lever having an end connected to a foot control via a pivot and link, said foot control overcoming said spring to release said platen, said pivot fixed to a strut depending from said support base, said support base including a plurality of legs elevating said support base top surface above the ground.

8. An engine head holder comprising, in combination:

upper and lower platens, means to allow rotation of said upper platen with respect to said lower platen, projection means on said upper platen to impale the head on said upper platen, and a support base upon which said lower platen is fixed, said upper platen rotateably attached through said lower platen and said support base by means of a centrally located bolt and pressure means urging said upper platen in fixed engagement with respect to said lower platen.

9. The engine head holder of claim 8 including a plurality of legs extending up from the ground into a bottom surface of said support base, and means for releasing said pressure means to allow said upper platen to rotate.

10. The engine head holder of claim 8 wherein said pressure means is a spring located on said bolt.

11. The engine head holder of claim 8 including a source of pneumatic air communicating with said lower platen, a groove circumscribing said lower platen and facing said platen, said groove having openings receiving said source of air whereupon activation of said air overcomes spring pressure and raises the platen from said lower platen allowing rotation of said platen.

12. The engine head holder of claim 11 including a support base supporting said platen.

13. The engine head holder of claim 12 further comprising a parts bin carried on a rear portion of said support base between a shelf mechanism and a tool holder, and a source of illumination attached to said work station projecting light on said platen.

14. The engine head holder of claim 13 including pivot means between said shelf mechanism and said base and between said tool holder and said base to allow rotation about said pivots.

15. The engine head holder of claim 8 wherein said projection means comprise first and second stud pins projecting from said platen and supported thereby, said stud pins having means to adjust the relative spacing between said stud pins allowing said stud pins to align with bores passing through the engine head to securely locate the engine head on said platen by said stud pins projecting into the bore holes.

16. The engine head holder of claim 15 including clamping means to constrain said stud pins from motion once said stud pins are holding the engine head.

* * * * *

UNITED STATES PATENT AND TRADEMARK OFFICE

CERTIFICATE OF CORRECTION

PATENT NO. : 5,944,303

DATED : August 31, 1999

INVENTOR(S) : Gary Reed

It is certified that error appears in the above-indentified patent and that said Letters Patent is hereby corrected as shown below:

On the title page, kindly change the Assignee's name from "Louis" to -- Louise --.

Signed and Sealed this

Eighth Day of February, 2000

Attest:

Q. TODD DICKINSON

*Attesting Officer*

*Commissioner of Patents and Trademarks*